James Stimpson.
Manner of uniting Boxes, Drawers, Furniture. &c.

No. 16,557. Patented Feb. 3, 1857.

UNITED STATES PATENT OFFICE.

JAMES STIMPSON, OF BALDWINSVILLE, MASSACHUSETTS.

METHOD OF JOINING BOXES, &c.

Specification of Letters Patent No. 16,557, dated February 3, 1857.

*To all whom it may concern:*

Be it known that I, JAMES STIMPSON, of Baldwinsville, in the county of Worcester and State of Massachusetts, have invented certain new and useful Improvements in the Manner of Joining or Putting Together Boxes, Drawers, Furniture, and other Articles; and I do hereby declare the following to be a full, clear, and exact description of the manner of doing the same, reference being had to the accompanying drawings, making a part thereof, in which—

Figure 1:
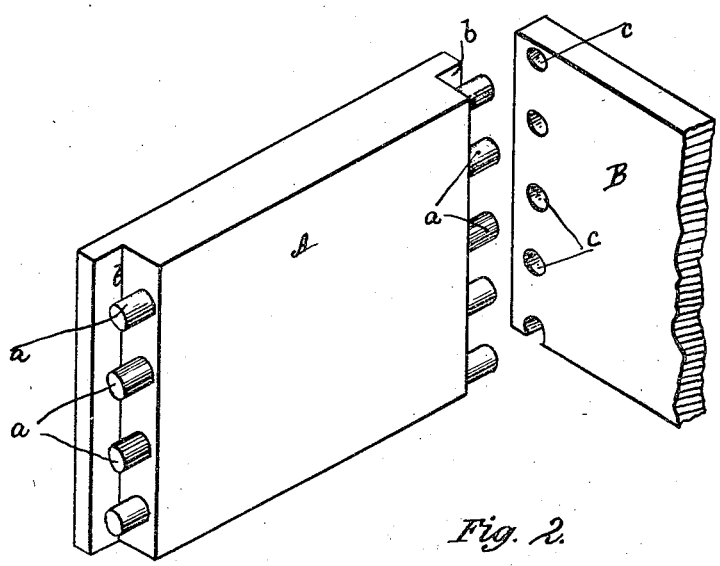
Figure 2:
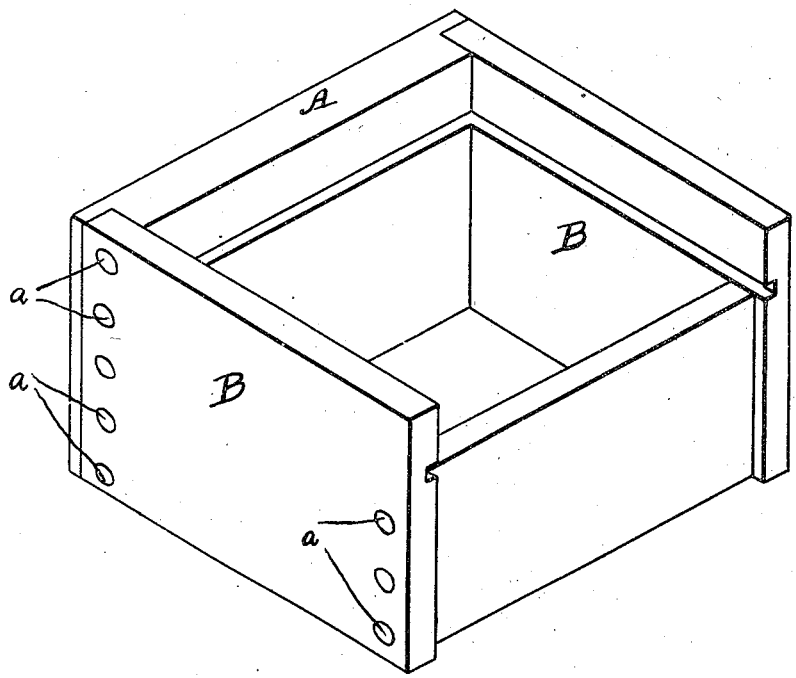

Figure 1 represents in perspective the manner of framing the ends, and sides of a box or drawer, and Fig. 2 represents in perspective a drawer put together after my plan.

Where similar letters of reference occur in the separate figures they denote like parts of the invention in both.

The nature of my invention relates to the manner of uniting the sides and ends of boxes, drawers, etc., and consists in the combined use of the round tenon and mortise, and the half-lap or secret-joint, for effecting this purpose.

To enable others skilled in the art to make and use my invention, I will proceed to describe the same with reference to the drawings.

A, represents the front end of a drawer or box, upon which a series of round tenons $a, a, a, a,$ are bored, by means of a hollow auger or bit, such as is generally used in making tree-nails, etc. After these tenons are thus formed, a half-lap, gain, or rabbet $b$ is formed, on the end of the piece A, into which the side pieces B, snugly fit, while the round tenons $a$, pass into, or through round mortises or holes $c$, in said side pieces. By letting the side pieces B, into the rabbet $b$, it makes what is termed a secret-joint. This mode of joining boxes or drawers differs from dovetailing in this, that dovetailing is very difficult to do, requiring a saw and chisel both, or their equivalents to form the dovetails, while in my invention it is simply boring. My invention differs from "doweling" in two respects, first the half-lap, or secret-joint, has not been used in "doweling," and secondly, a dowel is made of a separate piece of wood from that to be united, and not on one of the pieces to be united as I have represented.

Fig. 2 represents a drawer made after my plan, it being represented as inverted to show the grooves into which the bottom is slid, after it is put together. I use glue in putting these pieces together, just as in drawers of ordinary construction, and I thus make a joint equally as strong and durable as the dove-tail joint, while the expense is but a fraction of that of dovetailing.

My tenons, mortises, and rabbets, are all cut by machinery and when slipped together, fit with the nicest exactitude.

Having thus fully described the nature of my invention, what I claim therein as new and desire to secure by Letters Patent is—

The joining of boxes, drawers, furniture, etc., by means of round tenons and mortises, and a half-lap or secret-joint, as herein set forth and explained.

JAMES STIMPSON.

Witnesses:
   JAS. MARSH,
   D. A. NEWTON.